(12) United States Patent
Shanks et al.

(10) Patent No.: US 9,541,665 B2
(45) Date of Patent: Jan. 10, 2017

(54) FLUID DETERMINATION IN A WELL BORE

(71) Applicant: Zenith Oilfield Technology Limited, Inverurie (GB)

(72) Inventors: David Sirda Shanks, Aberdeen (GB); David Cyril Hendry, Banchory (GB)

(73) Assignee: Zenith Oilfield Technology Limited, Inverurie (GB)

( * ) Notice: Subject to any disclaimer, the term of this patent is extended or adjusted under 35 U.S.C. 154(b) by 27 days.

(21) Appl. No.: 14/346,863

(22) PCT Filed: Sep. 25, 2012

(86) PCT No.: PCT/GB2012/052373
§ 371 (c)(1),
(2) Date: Mar. 24, 2014

(87) PCT Pub. No.: WO2013/045913
PCT Pub. Date: Apr. 4, 2013

(65) Prior Publication Data
US 2014/0253128 A1    Sep. 11, 2014

(30) Foreign Application Priority Data
Sep. 30, 2011    (GB) .................................. 1116855.6

(51) Int. Cl.
*G01V 3/18*    (2006.01)
*E21B 47/10*    (2012.01)
(Continued)

(52) U.S. Cl.
CPC .................. *G01V 3/18* (2013.01); *E21B 47/00* (2013.01); *E21B 47/102* (2013.01); *E21B 49/08* (2013.01)

(58) Field of Classification Search
CPC ............. G01V 3/18; E21B 49/08; E21B 47/00
See application file for complete search history.

(56) References Cited

U.S. PATENT DOCUMENTS

| 3,981,187 A | 9/1976 | Howell |
| 4,267,727 A | 5/1981 | Hoppe |
| (Continued) | | |

FOREIGN PATENT DOCUMENTS

| CA | 2323234 | 4/2001 |
| CN | 1367858 | 9/2002 |
| (Continued) | | |

OTHER PUBLICATIONS

Hustedt, B., International Search Report for International Patent Application No. PCT/GB2012/052373, dated Jul. 12, 2013, European Patent Office.
(Continued)

*Primary Examiner* — Vinh Nguyen
*Assistant Examiner* — Alvaro Fortich
(74) *Attorney, Agent, or Firm* — Crowe & Dunlevy, P.C.

(57) ABSTRACT

A fluid measurement system (10, 110, 210) and method of fluid mix determination over a sampling length (25) in a well bore (12). A pulse generator is run in the well bore from which is suspended a cable (24) with two conductors having a length equal to the sampling length. A high frequency pulse is injected along the cable and from the detected response average propagation velocities over the various reflections are used to determine the mixture of fluids. Embodiments are described which improve the determination such as using a cable with sections of alternating impedance, helically wound cable, providing multiple signal generators, incorporating a mathematical model, analyzing the analog signal response, providing a reference cable and incorporating an optical distributed temperature sensor.

10 Claims, 10 Drawing Sheets

(51) Int. Cl.
*E21B 47/00* (2012.01)
*E21B 49/08* (2006.01)

(56) References Cited

U.S. PATENT DOCUMENTS

| | | | |
|---|---|---|---|
| 4,429,273 A | 1/1984 | Mazzagatti | |
| 4,597,183 A | 7/1986 | Broding | |
| 4,909,855 A | 3/1990 | Burley | |
| 5,010,316 A | 4/1991 | Burley | |
| 5,025,222 A | 6/1991 | Scott et al. | |
| 5,030,294 A | 7/1991 | Burley | |
| 5,033,297 A | 7/1991 | Gustafson | |
| 5,132,903 A * | 7/1992 | Sinclair | E21B 47/10 324/318 |
| 5,231,880 A | 8/1993 | Ward et al. | |
| 5,571,394 A | 11/1996 | Hettiarachchi et al. | |
| 5,818,241 A | 10/1998 | Kelly | |
| 5,926,024 A | 7/1999 | Blount et al. | |
| 6,064,002 A | 5/2000 | Hayami et al. | |
| 6,227,045 B1 | 5/2001 | Morse et al. | |
| 6,441,622 B1 | 8/2002 | Wrzesinski et al. | |
| 6,539,795 B1 | 4/2003 | Scherpenisse et al. | |
| 7,017,417 B2 | 3/2006 | Daigle | |
| 7,190,280 B2 | 3/2007 | Hall et al. | |
| 7,409,858 B2 * | 8/2008 | Dria | E21B 17/206 73/152.33 |
| 7,730,774 B2 | 6/2010 | Glasbergen et al. | |
| 8,074,713 B2 | 12/2011 | Ramos et al. | |
| 8,973,434 B2 | 3/2015 | Albrecht et al. | |
| 2003/0122535 A1 | 7/2003 | Williams et al. | |
| 2004/0031681 A1 | 2/2004 | Jett et al. | |
| 2004/0059513 A1 | 3/2004 | Bittar et al. | |
| 2004/0096614 A1 | 5/2004 | Quigley et al. | |
| 2005/0034873 A1 | 2/2005 | Coon et al. | |
| 2005/0083062 A1 | 4/2005 | Couch | |
| 2005/0172721 A1 | 8/2005 | Daigle | |
| 2005/0265121 A1 | 12/2005 | Scott | |
| 2005/0274513 A1 | 12/2005 | Schultz et al. | |
| 2006/0108112 A1 | 5/2006 | Simon | |
| 2006/0214098 A1 | 9/2006 | Ramos | |
| 2007/0071612 A1 | 3/2007 | Yuratich | |
| 2007/0119244 A1 | 5/2007 | Goodwin et al. | |
| 2007/0125163 A1 | 6/2007 | Dria et al. | |
| 2007/0158064 A1 * | 7/2007 | Pribnow | G01F 1/6884 166/250.01 |
| 2007/0239360 A1 | 10/2007 | Rabinovich et al. | |
| 2008/0048669 A1 * | 2/2008 | Scherber | G01S 13/89 324/534 |
| 2008/0061789 A1 * | 3/2008 | Coates | E21B 47/122 324/333 |
| 2008/0083273 A1 * | 4/2008 | Sroka | E21B 49/10 73/152.55 |
| 2008/0185138 A1 | 8/2008 | Hernandez-Solis et al. | |
| 2008/0224705 A1 | 9/2008 | Simon et al. | |
| 2008/0317095 A1 * | 12/2008 | Hadley | E21B 36/04 374/137 |
| 2009/0277629 A1 | 11/2009 | Mendez et al. | |
| 2009/0326826 A1 | 12/2009 | Hull et al. | |
| 2010/0223011 A1 | 9/2010 | Parsche | |
| 2010/0254650 A1 | 10/2010 | Rambow | |
| 2011/0007776 A1 | 1/2011 | Yamamoto | |
| 2011/0081256 A1 | 4/2011 | Thompson et al. | |
| 2011/0188344 A1 | 8/2011 | Hartog et al. | |
| 2011/0311179 A1 * | 12/2011 | Greenaway | E21B 47/123 385/12 |
| 2012/0075951 A1 * | 3/2012 | Johnson | G01V 1/46 367/32 |
| 2013/0091942 A1 | 4/2013 | Samson et al. | |
| 2014/0069810 A1 | 3/2014 | Tachibana et al. | |
| 2015/0090040 A1 | 4/2015 | Schumacher et al. | |
| 2015/0233211 A1 | 8/2015 | Bujold et al. | |

FOREIGN PATENT DOCUMENTS

| | | |
|---|---|---|
| CN | 1723332 | 1/2006 |
| CN | 2900784 | 5/2007 |
| CN | 101313127 | 11/2008 |
| CN | 101598581 | 12/2009 |
| CN | 201396147 | 2/2010 |
| DE | 2521411 | 11/1976 |
| DE | 19950111 | 2/2001 |
| DE | 10052922 | 5/2002 |
| EP | 0508894 | 10/1992 |
| EP | 1098197 A2 | 5/2001 |
| EP | 1574853 A1 | 9/2005 |
| GB | 2159663 | 12/1985 |
| GB | 2246866 | 2/1992 |
| GB | 2467177 | 7/2010 |
| GB | 2484990 | 5/2012 |
| GB | 2495132 | 4/2013 |
| WO | 9100996 A1 | 1/1991 |
| WO | 0011317 | 3/2000 |
| WO | 2007109772 A2 | 9/2007 |
| WO | 2011044023 | 4/2011 |
| WO | 2012/052764 | 4/2012 |

OTHER PUBLICATIONS

Hustedt, B., Written Opinion for International Patent Application No. PCT/GB2012/052373, dated Jul. 12, 2013, European Patent Office.

Kane, et al., "Applications of time domain reflectometry to landslide and slope monitoring", TDR 2002—Second International Symposium and Workshop on Time Domain Reflectometry for Innovative Geotechnical Application, pp. 1-14, Dec. 31, 2001.

Jie, et al., "Introduction to Numerical Simulation of Electrical Logging and Its Development Trend", Well Logging Technology, vol. No. 34, Issue No. 1, pp. 1-5, Feb. 28, 2010.

Combined Search and Examination Report issued in connection with corresponding GB Application No. GB1116855.6 dated Dec. 15, 2011.

Combined Search and Examination Report issued in connection with related GB Application No. GB1304282.5 dated Jul. 25, 2013.

* cited by examiner

FLUID DETERMINATION IN A WELL BORE

The present invention relates to well bore measuring techniques and in particular, though not exclusively, to a system and method for determining the fluid type and mixture present in a moving fluid along a length of a well bore.

The oil and gas industry is very dependent on well bore measuring techniques to provide information about what is actually happening deep in a well bore. Many surveys are done before oil or gas is produced, including seismic and rock porosity, water content and micro seismic. However, there are few methods of obtaining data which gives a broad measurement of the behaviour of the well over its whole length, especially while the well is being produced.

Point pressure and temperature sensors have been in commonplace use since the 1940's and production logging tools are also now customarily used. It is quite common in the oil and gas industry to run logging tools which measure water cut and well bore resistivity, and also optical distributed temperature sensing systems into oil wells to measure the temperature profile over the complete length of the well bore.

The point sensors only provide indications of what is happening at the position of the sensor. Logging tools measure the complete well bore, but not in real time and they can only be run periodically. Logging tools are also difficult to run, when there are pumps in the well bore. Distributed temperature measurement is limited by the fact that, while the temperature profile can be interpreted to give information about other behaviour in the well bore, the temperature information in its raw state is not immediately useful in terms of determining the type of fluid produced (or injected).

The oil and gas industry is under pressure to achieve greater efficiency and increase production rates, all of which requires more understanding of reservoir storage and production behaviour. This has created a need for more 2 dimensional and 3 dimensional measurements of reservoir behaviour.

Transmission lines are known for measuring interfaces between fluids by determining that a change in the dielectric properties between the transmission lines has occurred. This technique can be used to determine fluid levels in static, non-flowing, well bores as described in WO2011/044023 to Chevron USA Inc. WO2011/044023 discloses a system which includes a pulse generator to generate a pulse of electromagnetic energy to propagate along the wellbore towards a surface of the fluid, a detector to detect a portion of the electromagnetic pulse reflected from the surface of the fluid and propagated along the wellbore towards the detector, and a processor to analyse detected signals to determine a level of the surface of the fluid. In an embodiment, the system includes a pump controller to control the operation of a pump located in the well bore based on the fluid surface level.

A disadvantage in this system is in the number of unwanted reflections which are present giving false readings. These reflections occur at any dielectric interface through the well bore and as the transmission line is preferably created from the casing together with tubing located within the casing, acting as a central conductor, all connection points such as the casing joints will provide unwanted reflections.

To overcome this disadvantage the system proposes markers to give reflections at known depths to assist in determining the true reflection from the fluid surface. These may take the form of a coaxial choke or wiper arm which provide a local reduction in the dielectric properties over the length of the marker. Unfortunately, such markers do not work. This is because a reflection will occur when the pulse reaches the marker and when the pulse exits the marker due to the change in dielectric properties between the marker and the fluid. Each reflection will provide a response being the precise inverse of the other and, over the short length of marker, the responses will cancel each other out.

To also overcome the problems of unwanted reflections, the system provides an embodiment using a spooled pair of conductors as may be run into the well bore as part of a dewatering system. A disadvantage of this system is in the long cable lengths used to access deep wells where the pump is located. As the pulse generator is located at the surface, the pulse will have dispersed and reduced in signal strength by the time it has travelled to the fluid surface level it is supposed to measure. The same effects will occur on the reflected signal, which will, by its very nature of being a reflected response, be of reduced signal strength. If the system includes markers or a second fluid level is required to be determined, in practise, the return responses are indistinct at the surface of the well bore.

In GB1017814.3 to the present Applicant's use of reference cable assemblies to remove the changes and effects of the well bore and installation, as well as recording reflection times of pulses, is described to improve the determination of the level of the surface of the fluid. However, this system also suffers difficulty in determining the desired response due to the dispersive nature of the pulse as it travels over long cable lengths.

Due to the disadvantages in these prior art methods, they are limited to determining a fluid level surface in a static well bore. In a producing well where fluids are moving and discrete water levels do not exist, or in a pumped well below the intake of the pump where the fluid enters the well bore from the formation, a continuous and varying mixture of fluids and gasses generally exists. The current technology therefore does not allow measurement of moving and variable fluid mixtures.

It is therefore an object of the present invention to provide a system and method of measuring the fluid type and mixture present in two dimensions (time and depth) in a moving mixed fluid over a length of a well bore.

According to a first aspect of the present invention there is provided a system for measuring moving fluid along a sampling length in a well bore, comprising:

an electronics module having a first end adapted for connection to a wireline, the electronics module including a pulse generator operable downhole to generate a pulse;

a cable suspended from the electronics module, comprising a pair of conductors having a length substantially equal to the sampling length;

a data acquisition unit to record a response upon injection of the pulse along the cable; and a processor to determine the mixture of fluids from the response.

In this way, the pulse is generated and the response data is acquired at the location of the required measurement, so that the dispersion and losses in travelling over long cable lengths is mitigated. Additionally by measuring over shorter sampling lengths signal strength is not lost on spurious reflections as the sampling length can be chosen so that there are no joints, junctions or other undesired dielectric boundaries. Average propagation velocities over the various reflections are used to determine the mixture of fluids, with all reflections providing a measureable response.

The cable may be as used in level sensing systems and one conductor may take the form of a sensor wire. It has been found from experimental data that the characteristic impedance of such a level sensing system cables varies depending on the fluid surrounding the cable. The precise mechanism being that the signal velocity, group and phase vary depending on the dielectric and conductive properties of the fluids. This in turn means the velocity of propagation changes depending on the fluid the cable is immersed in. The velocity in gas is the fastest, oil slower and water slower still. Therefore the time taken for a signal to reach the bottom of the cable and be recorded at surface is a measure of the composition of the fluids it has passed through. So if a cable was installed across an oil gas or oil water boundary or indeed in a moving mixture of oil and gas or oil and water the average velocity of propagation is a measure of the mixture of the fluids over the length of that cable sensor.

Preferably the pulse generator is a high frequency signal generator providing a signal with a fast rise time, typically <5 nS. The signal may be selected from a group comprising: modulated carriers, pulse streams, pulse sequences and shorter simpler pulse bursts.

Preferably the cable has a plurality of sampling lengths. In this way, measurements can be made over each sampling length giving an array of fluid mixture measures and producing a 2-dimensional image of fluid properties.

Advantageously, the neighbouring sampling lengths have different characteristic impedances. Optionally, the cable has alternating sections with two discrete mechanical structures which have different characteristic impedances. The interface between the changing cable structure will provide a response which can be used as a reference for the velocity in each section. In this way, a multiple zone sensing cable can be constructed producing average velocity information in each cable section.

Preferably, each cable section is of a significant length. The length may be greater than 1 meter. Preferably the length is at least 20 meters. These are in direct contrast to the markers of WO2011/044023 which are discrete devices, clamps or sleeves. As discussed before these markers in practice do not provide useful information as the leading edge of the marker produces a response and the negative edge produces the inverse response, and so discrete small markers cancel their own signal. By using a cable with long sections of alternating properties this problem is overcome as the leading and trailing edge responses are long distances apart, consequently usable reference information is generated.

Preferably the conductors are arranged helically along the cable. By providing a spiral cable assembly we can increase the separation between the leading and trailing edge responses over equal lengths of cable. For example, a pulse edge travels typically at 200E6 m/s, so therefore the start and end responses from a 1 meter marker are only 5 nS apart (and the inverse of each other), in a long cable section of say 20 meters the responses are separated by 100 nS and so on. If we then also include a spiral cable assembly amplifying the effective length of the cable section by at least a factor of five we then have a 20 meter cable section with a 500 nS gap between leading and trailing edge responses. This technique can be extended by increasing the pitch of the spiral and also extending the length of the cable sections, until the system is operating at a practical bandwidth.

If a spiral sensor cable is used then the sample length of the cable is increased by a large factor increasing the effective spatial resolution. As the system uses high frequency pulses, the time intervals being measured are extremely small making small spatial measurements very difficult. For a straight cable, very high speed pulse sources will be required to get good resolution especially in moving fluids where the changes in fluid mixture will both change quickly and also will change over relatively short physical distances. Thus the spiral cable will overcome this by increasing the effective spatial resolution.

Preferably the signal comprises a PN sequence of high frequency pulses. This removes the major problem of extracting valid reflections from other responses and noise from the cable system when a simple pulse reflection is used for the measurement of pulse velocities. If a PN sequence of high frequency pulses is transmitted instead of a single pulse and the response from the system is then compared looking for the correct pulse sequence, the resolution and potential cable depth which can be measured increases.

Preferably, the processor compares the response to a mathematical model of the well bore to determine the mixture of fluids in each sampling length. Advantageously, the processor may interpret the response for a section by using the average properties in the adjacent sections of the well bore. Additionally, the processor may provide interpretation by looking at incremental changes between sections. In this way, while a two phase fluid mixture such as oil and gas or water and gas or water and oil, is easily determined, interpretation and use of a model will aid determination where there are three phases of fluids present, water oil and gas simultaneously.

Preferably, electronics modules are mounted at either end of the cable. The electronics modules may also be mounted at each end of each sampling length. By taking measurements at both ends of the section, the system may be effective in deep well bores to operate over long sampling lengths by limiting the effects from losses in the cable and also from progressively more confusing responses from the further away sections of the cable. Preferably also, where PN sequence signal sources are used these can run both real time and continuously in parallel. Advantageously, orthogonal PN sequences may be used so that two or more pulse sequences do not interfere with one another.

Preferably the system includes an analogue detection unit. Preferably also the system includes means to analyse the analogue reflection response. In this way, while the average fluid mixture is measured, information about where the fluid mixture changes over a section can be obtained. The primary measurement only gives an average over a complete zone. While it is not a measurement that can be easily calibrated, the analogue response from this pulse excitation system will show small reflections predominantly from continuous water sections around the cable, by analysing this analogue reflection response additional information about the changing fluids can be obtained adding some subjective detail to the basic measurement.

In an embodiment, the cable may comprise a pair of straight wires to act as the transmission line. This is an alternative to the spiral cable.

Preferably the system includes a third conductor. Preferably the third conductor is substantially the same as the first conductor of the pair of conductors. In this way, the third conductor is used as a reference to cancel effects of cable joints, changes in length, heating and other environmental effects. Alternatively, where the first connector comprises a plurality of alternating geometry sections, the third conductor comprises a single geometry to provide a reference.

Preferably, the system further includes an optical distributed temperature sensor and an associated heater element. In this way, fluid velocity information is obtained which when combined with the fluid composition information measure gives further information on the nature of the fluid in the well bore. The heat rise is measured in two dimensions using the distributed temperature sensor system. Where there is a lot of gas present the heat rise is much greater than in an area where there are predominantly fluids. This heat rise information when calibrated with the fluid mixture measurement outlined here then allows more accurate determination of the mixture of combinations of oil water and gas. Given that the pulse velocity measurement can be calibrated in oil water and gas water mixtures the heat rise created by the presence of gas can be used with these calibrations to determine relative amounts of gas and oil. This is especially useful with high volumetric concentrations of gas.

According to a second aspect of the present invention there is provided a method of determining a fluid mixture flowing in a well bore, the method comprising the steps:

(a) running a pulse generator on a wireline into a fluid flow in a well bore;
(b) injecting a pulse along a cable suspended from the pulse generator in the fluid;
(c) recording a response of an average velocity of propagation of the pulse over the cable; and
(d) determining a mixture of fluids over the length of the cable.

Preferably, a plurality of responses are recorded from reflections of the signal at interfaces within the cable.

Preferably, step (b) comprises injecting a PN sequence of high frequency pulses and step (c) includes matching the correct pulse sequence to record a response.

Preferably, step (c) includes the step of comparing the response to a mathematical model. The method may also interpret a response by comparison to other responses.

Preferably the method includes the step of measuring responses at a plurality of locations along the cable. Preferably the responses may be measured at each end of the cable. The method may also include the step of generating signals at different positions along the cable. This allows determination over sections of the cable. Additionally, orthogonal PN sequences can be injected to avoid interference.

Preferably the cable comprises a first and a second conductor arranged as a transmission line.

Preferably, responses from a third conductor are recorded to provide a reference to the cable.

Preferably, the method includes the step of recording analogue responses to provide additional information for the determination.

Preferably the method includes the steps of locating an optical distributed temperature sensor cable and a heating element through the conduit; heating the element and measuring the heat loss through the fluids to provide fluid velocity information; and using the information to assist in the determination of the mixture of fluids.

Embodiments of the present invention will now be described, by way of example only, with reference to the accompanying drawings of which:

FIGS. 9(a), (b) and (c) are cross-sectional and schematic illustrations, respectively, of a cable for use in a fluid measurement system according to a yet further embodiment of the present invention.

Figure 1:
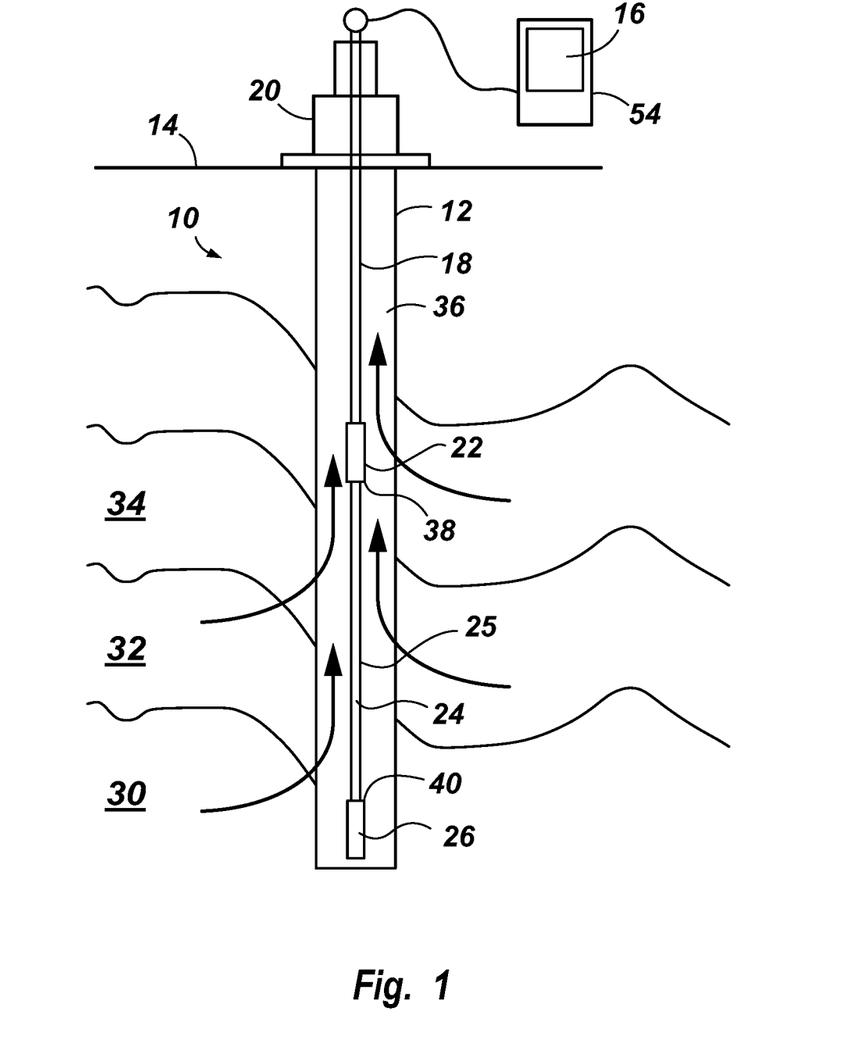
FIG. 1 is a schematic illustration of a fluid measurement system according to a first embodiment of the present invention.

Reference is initially made to FIG. 1 of the drawings which illustrates a fluid measurement system, generally indicated by reference numeral 10, according to an embodiment of the present invention. System 10 is located in a well bore 12. At the surface 14 of the well bore 12, is a processor based surface panel 16 for processing data collected down hole and control of the system 10. The panel 16 is connected to a wireline 18 which runs through the wellhead 20 to access the well bore 12. While we use the term wireline, those skilled in the art will recognise that any connection which can convey electrical signals could be used to run the system into a well bore. The wireline 18 meets an upper electronics module 22 from which descends a sensor wire 24 terminating at a lower electronics module 26. The electronics module 22 includes a pulse generator and a data acquisition unit. Sensor wire 24 acts as the sampling length 25 for the fluid measurement system 10.

Well bore 12 is drilled in a geological formation 28 to access hydrocarbons in the form of gas 30 and oil 34. The hydrocarbons 30,34 will travel up the well bore 12 as a fluid mix 36 which typically includes brine/water 32. The fluid 36 flow can be natural if sufficient downhole pressure exists or alternatively, the fluid 36 is assisted to the surface typically by pumps (not shown) located in the well bore 12. The components and the quantities of each within the fluid mix 36 will vary as the fluid mix flows up the well bore 12 due to the entrance of further components along the length of the well bore. Additionally, components may combine to form multi-phase mixes with the presence of each pure component being dependent on the temperature and pressure at the respective location in the well bore 12. In order to produce the well bore 12 efficiently it is desired to know the composition of the fluid mix 36 with time and depth in the well bore 12.

The sensor wire 24 is entirely surrounded by the fluid mix 36. A high frequency pulse, typically with a rise time of <5 ns, is injected through the wire 24. The signal is generated at the upper electronics module 22. The response to the pulse from the wire is detected at the electronics modules 22,26 either as a single pass through the wire or as a double pass formed by reflection of the pulse at an end 40 of the wire.

It has been found from experimental data that the characteristic impedance of the wire 24 varies depending on the fluid surrounding the wire 24. The precise mechanism being that the signal velocity, group and phase vary depending on the dielectric and conductive properties of the fluids. This in turn means the velocity of propagation changes depending on the fluid the cable is immersed in. The velocity in gas is the fastest, oil slower and water slower still. Therefore the time taken for a signal to reach the bottom of the cable and be recorded at surface is a measure of the composition of the fluids it has passed through. A typical response to a pulse through a sensor wire 24, for oil 34, brine (salt water) 32 and gas 30 is shown in FIG. 2.

Figure 2:
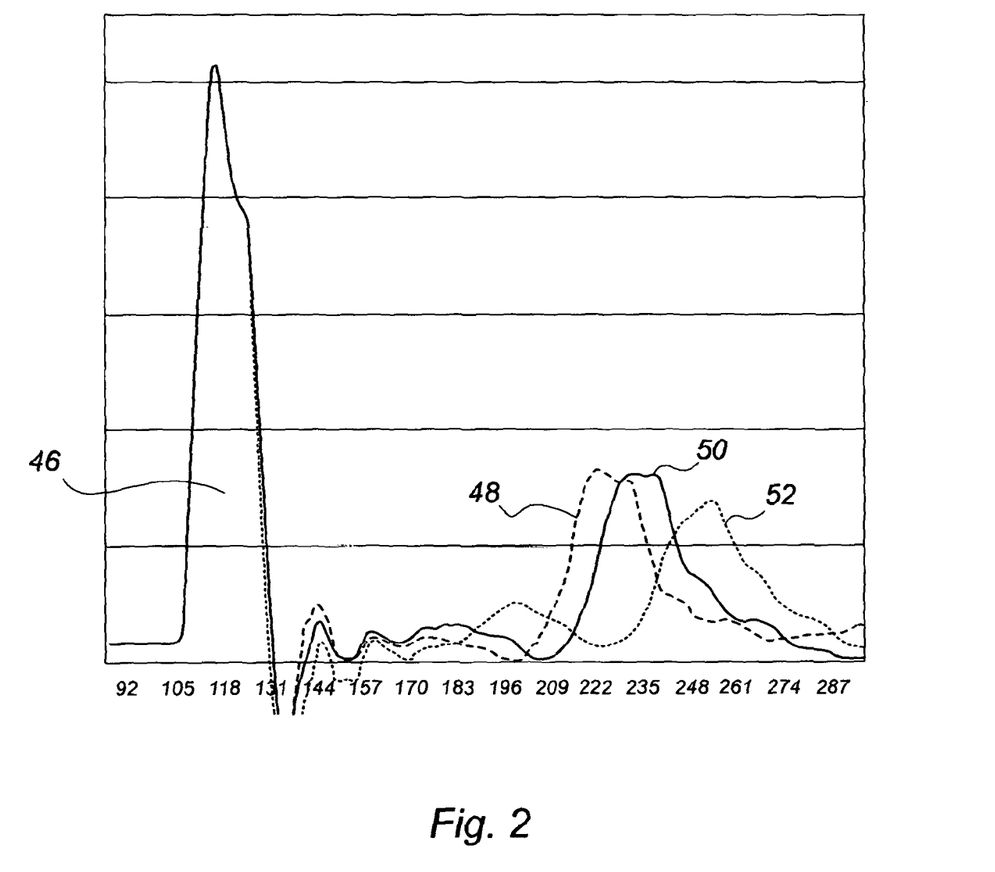
FIG. 2 is a graph of signal strength against time, illustrating the response for three pulses injected into gas, water and oil respectively.

Referring now to FIG. 2 there is shown a plot of signal strength 42 against time 44 which illustrates the basic principle that the velocity of the pulse as can be measured by the time for the reflection to return to the injection point, varies proportionally with the fluid type. The injected high frequency pulse 46 is injected into the sensor wire 24 from the upper 22 or lower 26 electronics module. The pulse is reflected from the end of the sampling length 25 and returns to the source some time later and is collected at the data acquisition unit. The time taken to return is proportional to the fluid mixture in the sensing zone which is the zone surrounding the sampling length 25. As seen in FIG. 2, the response pulse differs in time with the fastest being for a wire 24 surrounded by gas 48, then oil 50 and finally brine or salt water 52. So if the section 25 is installed across an oil gas or oil water boundary or indeed in a moving mixture of oil and gas or oil and water the average velocity of propagation is a measure of the mixture of the fluids over the length of that sensor wire 24.

The response is detected in a data acquisition unit 54 housed in an electronics module 22,26. The data is relayed to the surface processor 16. Alternatively, processing could be carried out in the electronics modules 22,26 if desired. The response is analysed to determine the components of the fluid mixture 36. The result is provided for the zone of the well bore 12 in which the sampling length 25 is located. This is an average across the length of the zone. To obtain measurements for different zones in the well bore a number of sampling lengths 25 are required.

Figure 3:
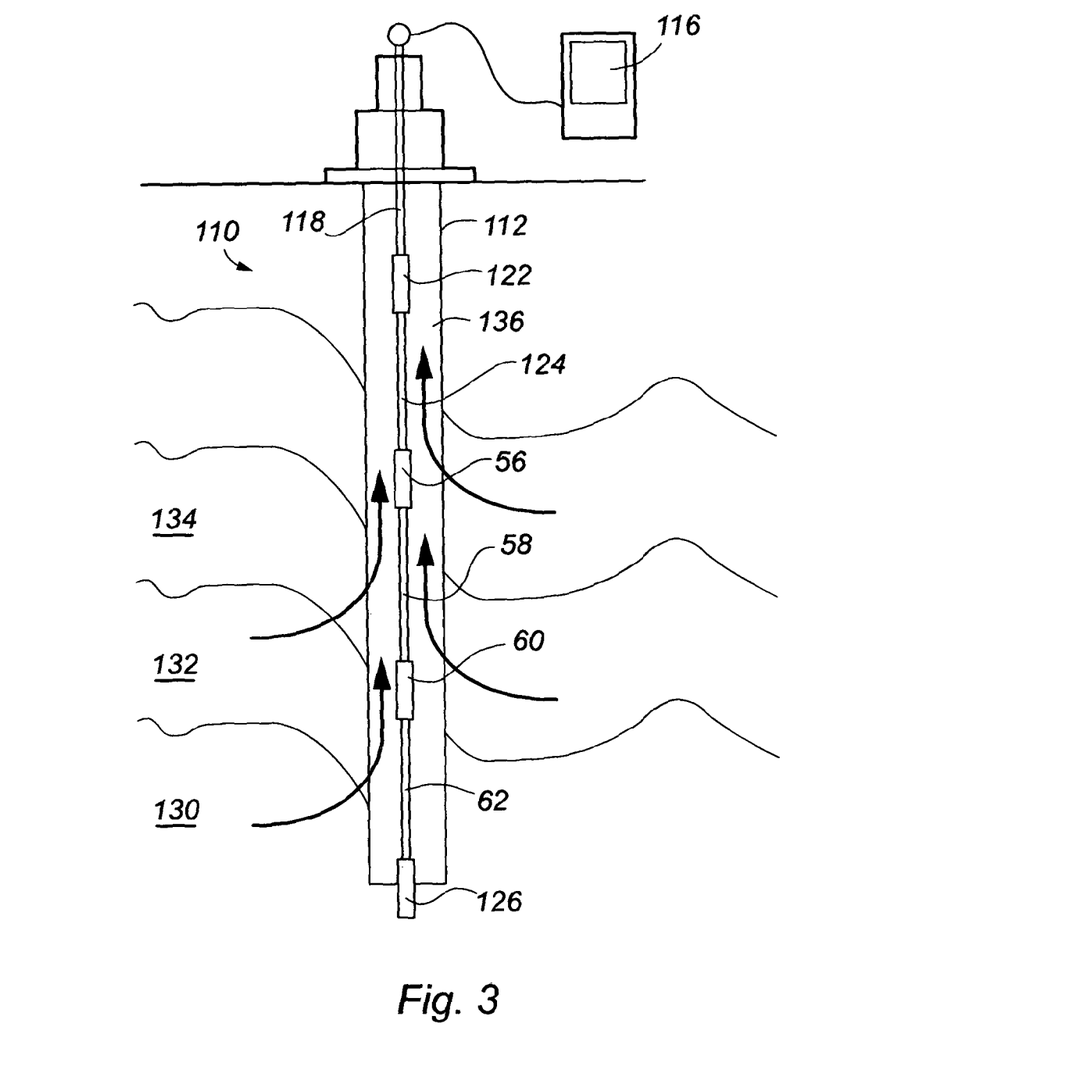
FIG. 3 is a schematic illustration of a fluid measurement system according to a second embodiment of the present invention.

Reference is now made to FIG. 3 of the drawings which illustrates a fluid measurement system, generally indicated by reference numeral 110, according to a further embodiment of the present invention. Like parts to those of FIG. 1 have been given the same reference numeral with the addition of 100 to aid clarity. The fluid measurement system 110 has a processor based surface panel 116 connected to a wireline 118 which connects to the sensing sections. The cable 118 connects to an upper electronics module 122, a first sensor wire 124, a second electronics module 56, a second sensor wire 58, a third electronics module 60, a third sensor wire 62 and completed with a lower electronics module 126. While three sensor wires 124,58,62 with electronic modules at either end, any number of zones can be created by selecting the number and length of sensor wires desired.

The sensor wires 124,58,62 are immersed in the well bore 112 with fluids and gasses 130,132,134 all contributing to the well bore fluid mixture 136. The system 110 measures the average fluid properties between modules; module 122 and subsequent module 56; module 56 and lower module 60; and module 60 and the lowest module 126. In addition, measurements can be made between any pair of modules to provide additional data for the analysis. Determination of the fluid mixture in each zone between the modules produces a 2-dimensional measure of the fluid properties over entire length of the sensing section of the cable.

Figure 4:
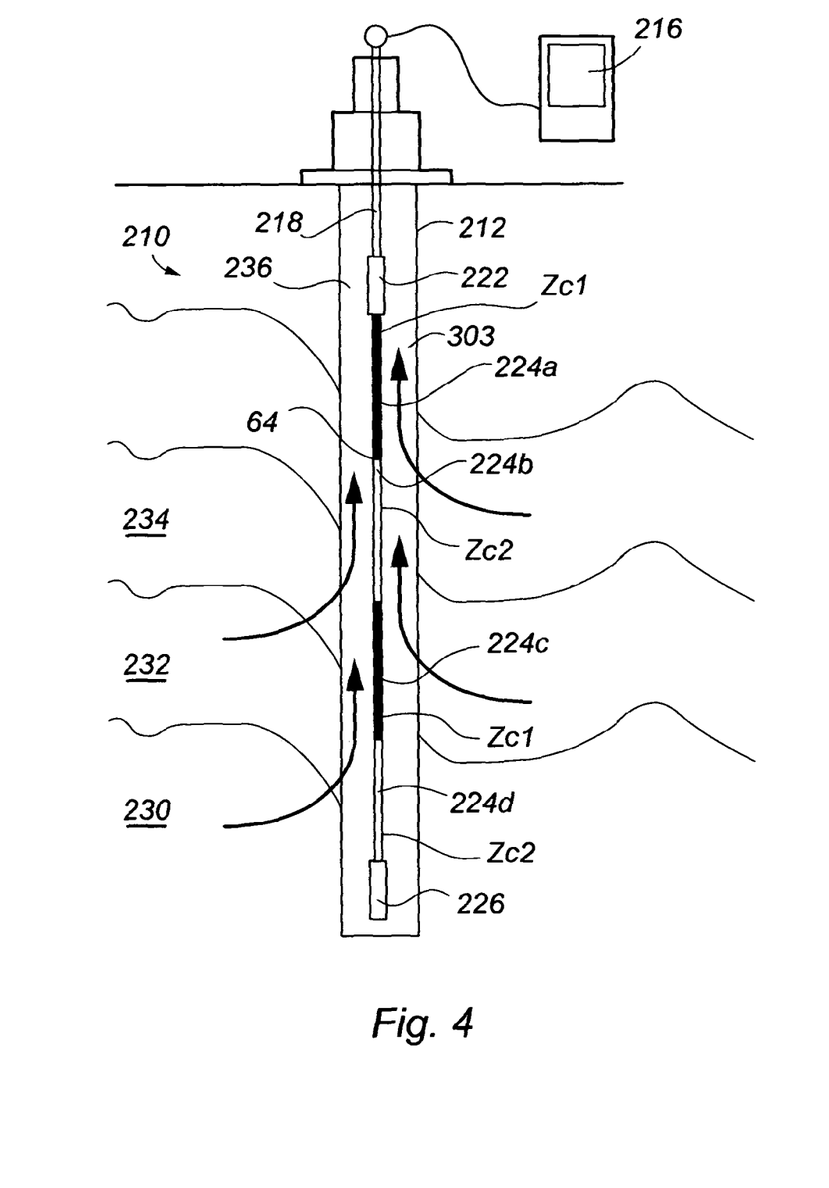
FIG. 4 is a schematic illustration of a fluid measurement system according to a third embodiment of the present invention.

Reference is now made to FIG. 4 of the drawings which illustrates a fluid measurement system, generally indicated by reference numeral 210, according to a further embodiment of the present invention. Like parts to those of FIG. 1 have been given the same reference numeral with the addition of 200 to aid clarity. The fluid measurement system 210 has a processor based surface panel 216 connected to a wireline 218 which connects to the sensing sections. The cable 218 connects to an upper electronics module 222. In this embodiment the sensor wire 224 is constructed of two different geometries 224*a-d*. The two geometries are alternating sampling lengths being relatively long lengths of wire having different impedances. Each sampling length is between 100 and 500 feet. While only four sections 224*a-d* are shown, two of each impedance, there can be up to N further alternating sensor wire sections, completed with a lower electronics module 226. The system is immersed in a well bore with fluids and gasses 230,232,234 all contributing to the well bore fluid mixture 236. The system 210 measures the average fluid properties over the sensor length from upper module 222 and lower module 226. It will also produce a measure of fluid properties between the alternating sections of the cable 224*a-d* as each interface 64 between neighbouring sections of differing impedance will create a reflected signal. As with the system 110, fluid mixture properties can be determined for each zone, with each zone represented by a sampling length. This produces a 2-dimensional measure of the fluid properties over the sensing zone.

Figure 5:
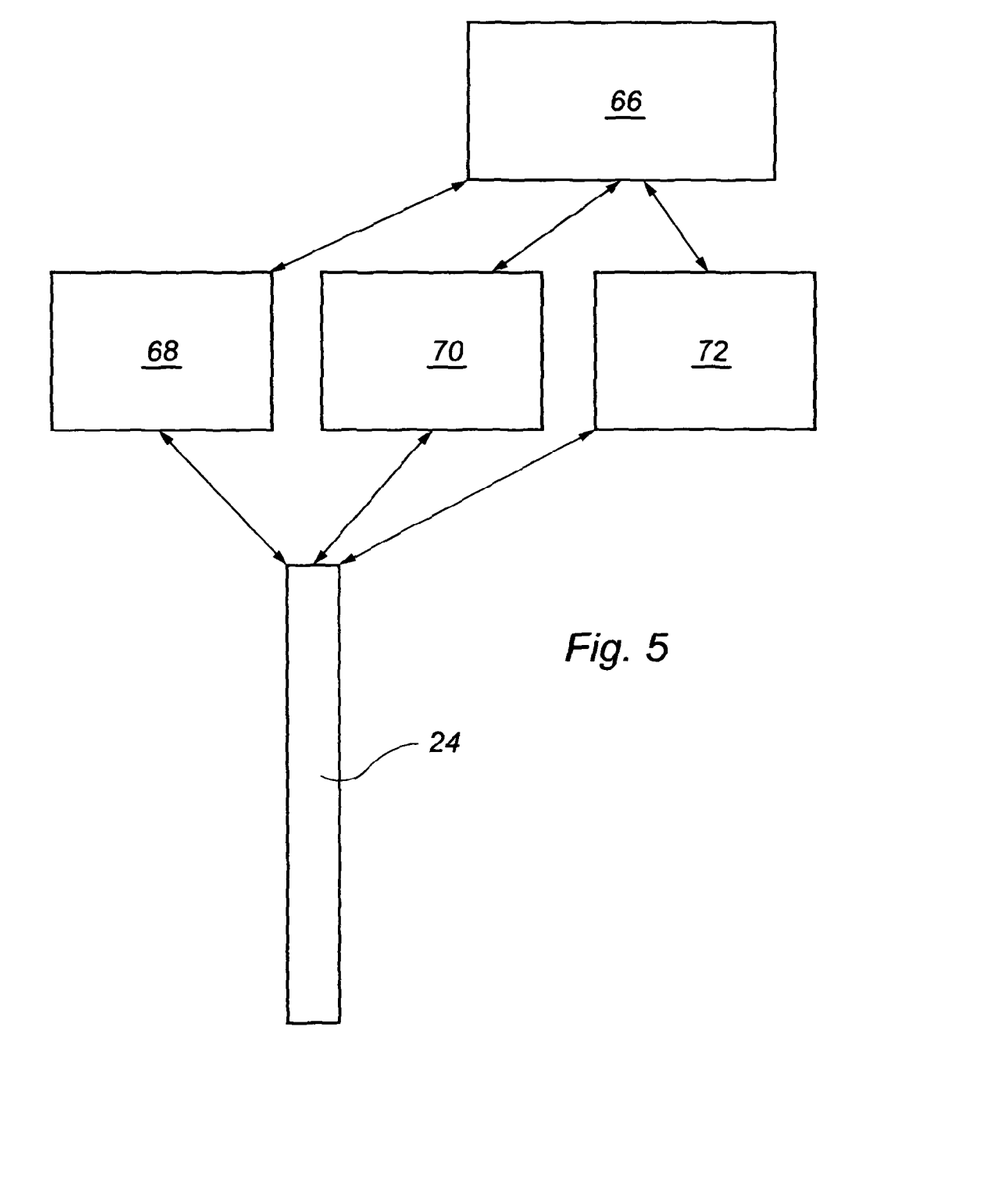
FIG. 5 is a schematic illustration of an electronics module according to an embodiment of the present invention.

The electronics module 22 required to make these measurements is illustrated in FIG. 5. This includes a control processor or embedded PC type device 66, a pulse generator 68, a frequency generator 70 and a high speed data capture module 72, all connected to the sensor wire 24. The electronics module 22 will typically generate a single pulse or pulse stream or pulse sequence. This can be a single pulse or a continuous stream of high frequency pulses. The electronics module may also generate swept sine wave outputs and measure frequency response behaviour as well as reflective behaviour from HF pulses. The processor module 66 may also perform correlation between generated pulse sequences and all recorded responses to achieve highly sensitive outputs of responses that match the transmitted pulse stream. The pulses may also be coded, for example by using PN sequencing, to remove spurious signals created by reflections from other surfaces in the well bore 12, or noise from surface electrical equipment and the like.

There are a number of additional features and embodiments which can be added to the system 10,110,210 to improve the determination of the fluid mix 36,136,236. The surface processor 16, or any other point of analysis, may incorporate a mathematical model of the well bore 12 and system 10 based on historical data, other well measurements or previous data recorded by the system 10. The mathematical model can also be used for comparison to estimate oil gas and water levels and likely interface points by iteration and comparison with the live recorded data. This comparison can either be done manually by an operator or automatically in a software system incorporated into the surface processing unit 16. Such matching can provide improved predictions of the fluid mix 36.

Figure 6:
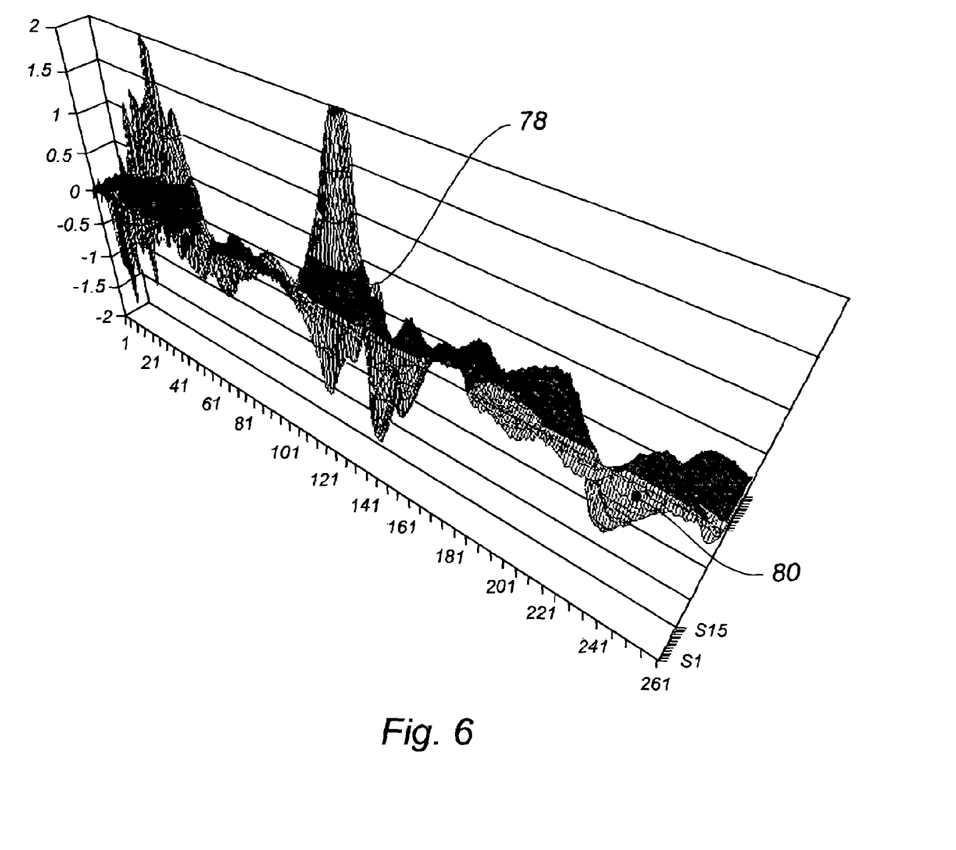
FIG. 6 is a graph of an analogue signal response.

An analogue response can also be recorded. While the average fluid mixture is measured, this analogue response can give information about where the fluid mixture changes over a section. The primary measurement only gives an average over a complete zone. While it is not a measurement that can be easily calibrated, the analogue response from this pulse excitation system will show small reflections predominantly from continuous water sections around the cable, by analysing this analogue reflection response additional information about the changing fluids can be obtained adding some subjective detail to the basic measurement. FIG. 6 illustrates use of the analogue response as either a direct trace response from a single pulse or the correlation output from a pulse sequence response. These responses can be further sensitised by reference to a mathematical model or referenced to the response of the sensing system in controlled conditions such as reference fluids. The imaging after processing can show indications of places over the sensing length where there are changes in the fluid composition, 78,80. This is an example of processed data recorded in moving oil water mixture, clearly showing that points of fluid change can be highlighted. This is predominantly a qualitative measure. When used in conjunction with the average fluid property information it can produce a very detailed picture of the fluid changing over the length of the system 10.

The signal quality and measurement can be further improved by incorporating a reference system. This takes the form of a third conductor or transmission line run in parallel to the sensor wire 24. Note that a second conductor is present with the sensor wire 24 to provide a transmission line. The third conductor may be of a single wire or may have alternating sections to match the sensor wire if such an arrangement is in use. The responses from the sensor wire and the third conductor can then be compared, using the third conductor response as a reference to cancel the effects of cable joints, changes in length and heating and other environmental effects.

The system 10 can also be combined with an optical distributed temperature sensor (DTS) cable and a central heater element. The heat loss from the heater element at the core of the cable will provide fluid velocity information using the same principle as used in hot wire anemometers. The heat rise from the central heater or other heating element, is measured in two dimensions using the DTS system. Where there is a lot of gas present the heat rise is much greater than areas where there are predominantly fluids. This heat rise information when calibrated with the fluid mixture measurement outlined here then allows more accurate determination of the mixture of combinations of oil water and gas. Given that the pulse velocity measurement can be calibrated in oil water and gas water mixtures the heat rise created by the presence of gas can be used with these calibrations to determine relative amounts of gas and oil. This is especially useful with high volumetric concentrations of gas.

Figure 7:
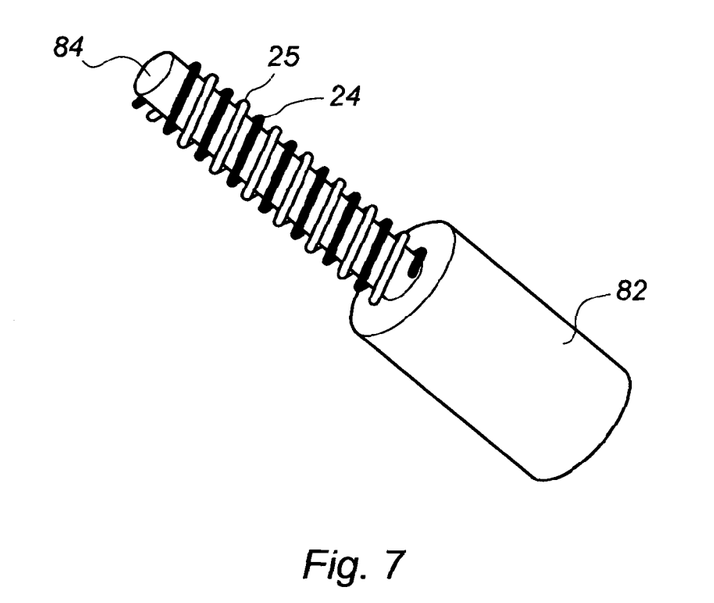
FIG. 7 is a schematic illustration of a spiral wound cable for use in the present invention.

A physical approach to improving the signal quality is in the use of a spiral cable assembly as illustrated in FIG. 7. Use of spiral cable 82 to amplify the spatial resolution of the system is achieved by making the actual distance the pulse travels in the wire 24 much longer than the physical length of the sensor wire in the well bore 12. The ground/return conductor 25 of the conductor pair is also shown providing the transmission line arrangement. The sensitivity can be improved by an order of magnitude with a suitably designed cable. For example, a pulse edge travels typically at 200E6 m/s, so therefore the start and end responses from a 1 meter marker are only 5 ns apart (and the inverse of each other), in a long cable section of say 20 meters the responses are separated by 100 nS and so on. If we then also include a spiral cable assembly 82 amplifying the effective length of the cable section by at least a factor of five we then have a 20 meter cable section with a 500 nS gap between leading and trailing edge responses. This technique can be extended by increasing the pitch of the spiral and also extending the length of the cable sections, until the system 10 is operating at a practical bandwidth.

Figure 8A:
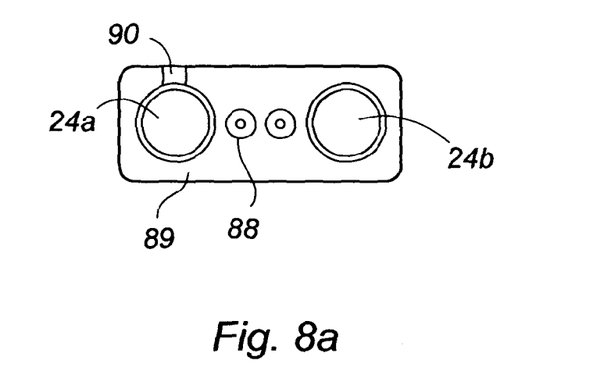
FIGS. 8(a) and (b) are cross-sectional and schematic illustrations, respectively, of a cable for use in a fluid measurement system according to a further embodiment of the present invention.
Figure 8B:
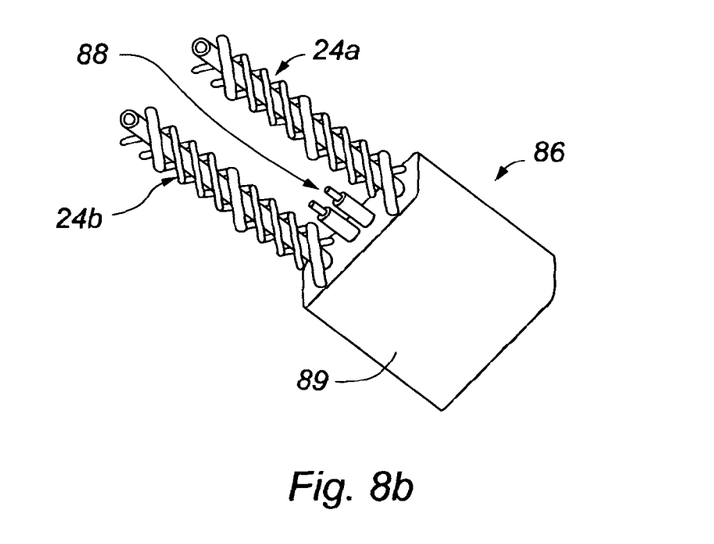

Use of a spiral cable 82 also provides a core 84 which can be used to strengthen the system 10 by supporting the sensor wire 24 and ground/return conductor 25. A further embodiment of a cable 86 is illustrated in FIGS. 8(*a*) and 8(*b*). Cable 86 comprises a pair of spiral wound sensor wires 24*a,b* as transmission lines. Each spiral wound sensor wire 24*a,b* is as described with reference to FIG. 7. The wires 24*a,b* are identical including the core 84*a,b* on which they are each wound. The cable 86 also includes a pair of wires 88 for control and data communications to electronics modules. The wires 88 may be of any number and may be omitted if desired. The components 24,84,86 are all encased in a ruggedized material 89 to prevent damage in the harsh environment. Note that a notch 90 is formed in the material 89 at the location of one of the sensor wires 24*a*. This notch 90 marks this as the 'live' wire 24*a*, which is more in communication with the fluids in the well bore than the second wire 24*b* which is referred to as the reference wire 24*b*. In use, the cable 86 will perform as described with reference to the earlier fluid measurement systems of FIGS. 1 to 5. The signal will be detected from live sensor wire 24*a*. Additionally a reference signal will be detected from reference sensor wire 24*b*. As sensor wire 24*b* is identical to sensor wire 24*a*, and they will have been exposed to the same environmental conditions down hole, the signal from live wire 24*a* can be corrected by referencing to the signal reference wire 24*b*. This ensures that the signal used for analysis and calculation of fluids only represents effects from the fluid which it has been exposed to through the notch 90.

Figures 9A, 9B:
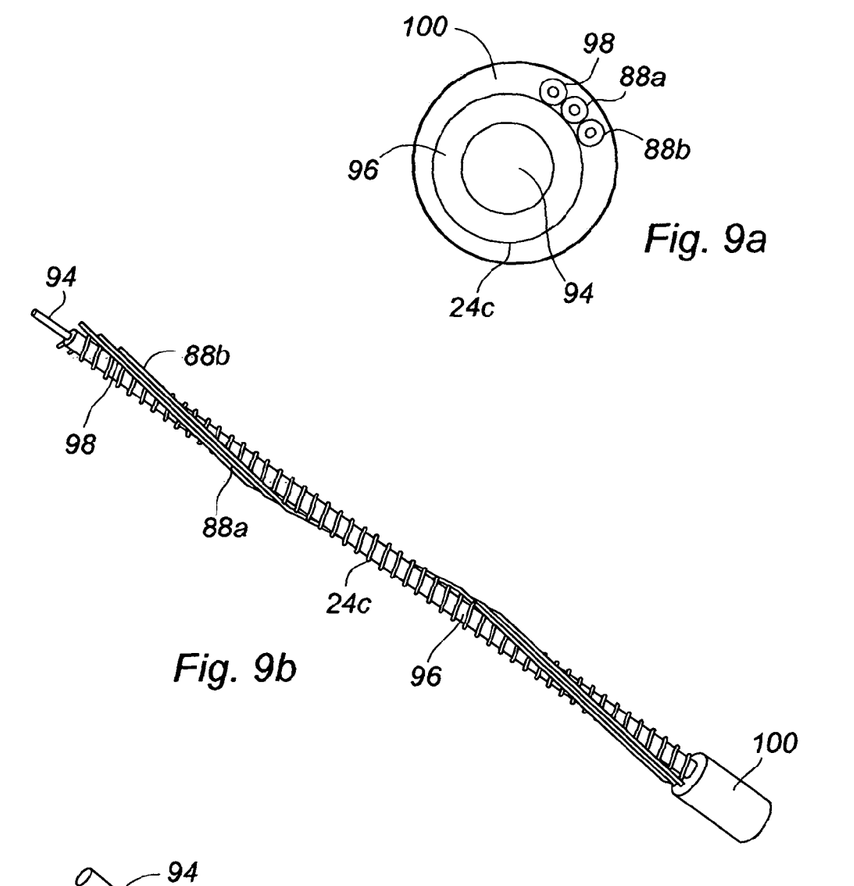
Figure 9C:
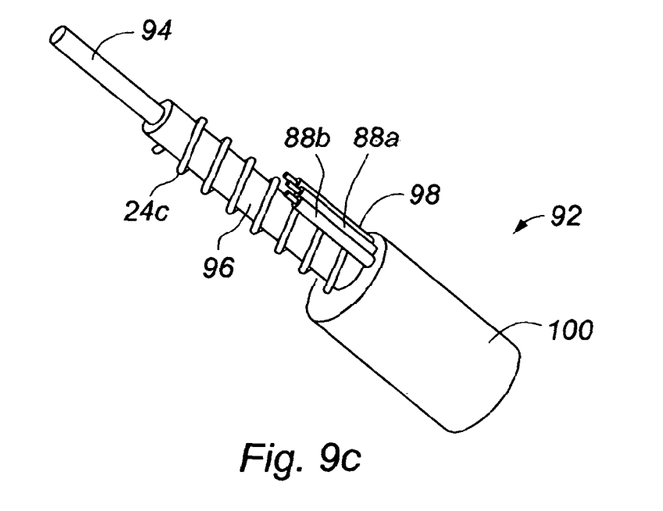

A further embodiment of a cable 92, suitable for use in the fluid measurement system of the present invention, is shown in FIGS. 9(*a*),(*b*) and (*c*). Like parts to FIGS. 7 and 8 have been given the same reference numerals to aid clarity. The dimensions shown in FIG. 9 are for illustrative purposes only and are not necessarily to scale. Cable 92 is cylindrical in cross-section having an eccentrically arranged heater wire 94. Heater wire 94 is encased in an insulating but thermally conducting material layer 96 which insulates the heater wire 94 from live sensor 24*c* while allowing heat conduction through the cable 92 to a fibre optic sensor cable 98. Arranged beside the live sensor wire 24*c* and the fibre optic cable 98 are a ground return wire 88*a* for the live sensor wire 24*c* and a communication wire 88*b* for connections between the electronics modules. The live sensor wire 24*c* is helically wound in a close spaced spiral on the material layer 96. The peripheral wires 88*a*,88*b*,98 are on a spaced helix primarily to aid construction of the cable 92. The entire cable 92 is encapsulated in a ruggedized material 100 to provide a cylindrical cable for easy deployment into a well bore. In use, the cable 92 provides a fluid measurement system via the live sensor cable 24*c* as described herein before together with a distributed temperature sensor via the heater wire 94 and the fibre optic sensor cable 98. With measurements from each of these systems, fluid velocity information is combined with the fluid composition information to give further information on the nature of the fluid in the well bore. The heat rise from the wire 94 is measured in two dimensions using the distributed temperature sensor cable 98 and this heat rise information when calibrated with the fluid mixture measurement outlined herein then allows more accurate determination of the mixture of combinations of oil water and gas in the well bore.

Figure 10A:
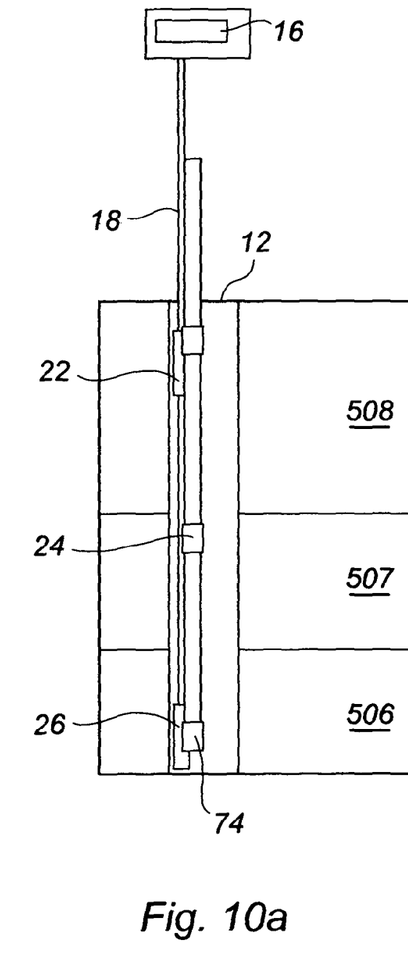
FIGS. 10(a) and 10(b) are schematic illustrations of fluid measurement systems deployed in well bores.

The system 10,110,210 can be conveyed into a well bore 12,112,212 strapped to tubing 74 as illustrated in FIG. 10(*a*). The surface electronic module 16 is connected to the sensing array by a connecting cable 18 and this is strapped to the tubing 74. There is an upper electronics module 22 and a sensing area with either multiple cable geometries or electronics modules and the lower end is terminated with a lower electronics module 26.

Figure 10B:
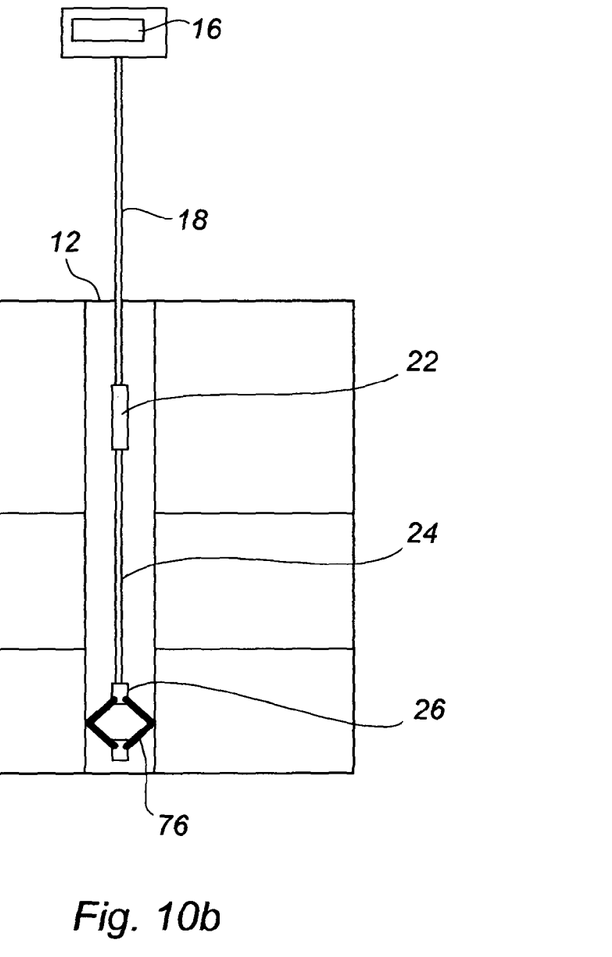

An alternative deployment arrangement is shown in FIG. 10(*b*). The system 10 is lowered under gravity or dragged into the well bore 12 with a tractor and secured in place. This self-deployed system would have a surface logger and recorder 16 a connecting cable 18 connected to the upper electronics module 22 and then a sensing section 24. The sensing section can be a single section of cable, or multiple sections with multiple electronic modules or multiple sections of differing cable geometry as described hereinbefore, all terminated with a lower electronic module 26 which may incorporate an anchor or hanger 76 to secure the cable in place.

The principle advantage of the present invention is that it provides a system and method of measuring the fluid type and mixture present in two dimensions (time and depth) over a length of a well bore.

A further advantage of the present invention is that it can make the determination in near real-time allowing for improved efficiency in operating a well.

A yet further advantage of the present invention is that it can make the determination on a producing well without the requirement of stopping production during measurement as with prior art logging systems.

It will be apparent to those skilled in the art that modifications may be made to the invention herein described without departing from the scope thereof. For example, the conductors may be parts of the structure of the well bore such as tubing and casing. While the Figures show vertical well bores, the system can be run through any conduit in any orientation. Thus horizontal and multi-lateral well bores can be used. Additionally the system finds application in pipelines.

The invention claimed is:

1. A system for measuring moving fluid over a length of a well bore, comprising:
 upper and lower electronics modules and a sensor wire descending from the upper module and terminating in the lower module, and the upper module having a first end adapted for connection to a wireline, the upper electronics module including a pulse generator for injecting a pulse through the sensor wire;
 a reference system comprising a cable run in parallel with the sensor wire, the sensor wire having a length which acts as a sampling length;
 a data acquisition unit to record a response upon injection of the pulse along the cable, said response being dependent on the characteristic impedance of the sensor wire in the fluid, and being detected at the electronics modules either as a single pass through the wire or as a double pass formed by reflection of a pulse at an end of the wire; and
 a processor to determine the mixture of fluids from the response.

2. A system according to claim 1 wherein one or more further electronics modules and cables are suspended in sequence within the fluid to provide a linear array of sampling lengths.

3. A system according to claim 1 wherein each sampling length comprises a plurality of sections with neighbouring sections having different characteristic impedances.

4. A system according to claim 1 wherein the sampling length is arranged helically along the cable in a spiral arrangement.

5. A system according to claim 1 wherein the pulse generator provides a signal selected from a group comprising: modulated carriers, pulse streams, pulse sequences, pulse bursts and a PN sequence of high frequency pulses.

6. A system according to claim 1 wherein the processor includes means to compare the response to a mathematical model of the well bore to determine the mixture of fluids in each sampling length.

7. A system according to claim 1 wherein the electronics module includes the data acquisition unit.

8. A system according to claim 1 wherein electronics modules are mounted at each end of each sampling length.

9. A system according to claim 1 wherein the system includes an analogue detection unit and means to analyse the analogue reflection response.

10. A fluid measurement system according to claim 1 wherein the system further includes an optical distributed temperature sensor and an associated heater element.

* * * * *